United States Patent [19]
Gilligan et al.

[11] Patent Number: 4,915,481
[45] Date of Patent: Apr. 10, 1990

[54] APPARATUS FOR PREVENTING SPACE CHARGE BUILDUP EFFECTS IN ELECTRICALLY CONTROLLABLE OPTICAL TRANSMISSION CELLS

[75] Inventors: Lawrence H. Gilligan; Thomas M. Woolfolk, both of Charlottesville, Va.

[73] Assignee: Sperry Marine Inc., Charlottesville, Va.

[21] Appl. No.: 236,568

[22] Filed: Aug. 25, 1988

[51] Int. Cl.$^4$ ............................ G02F 1/01; G02F 1/03
[52] U.S. Cl. .................................... 350/355; 350/392; 350/393; 350/387
[58] Field of Search ............... 350/384, 389, 392, 393, 350/387, 355, 356

[56] References Cited

U.S. PATENT DOCUMENTS 4,621,903 11/1986 Murano ........................... 350/393 X
4,793,697 12/1988 Wu .................................. 350/392 X

FOREIGN PATENT DOCUMENTS 2712323 10/1977 Fed. Rep. of Germany ...... 350/393

Primary Examiner—Eugene R. LaRoche
Assistant Examiner—Nathan W. McCutcheon
Attorney, Agent, or Firm—Seymour Levine

[57] ABSTRACT

A Kerr cell in an electro-optical shutter is coupled in a leg between "H connected" switches so as to reverse the polarity of the actuating potential applied across the cell.

5 Claims, 1 Drawing Sheet

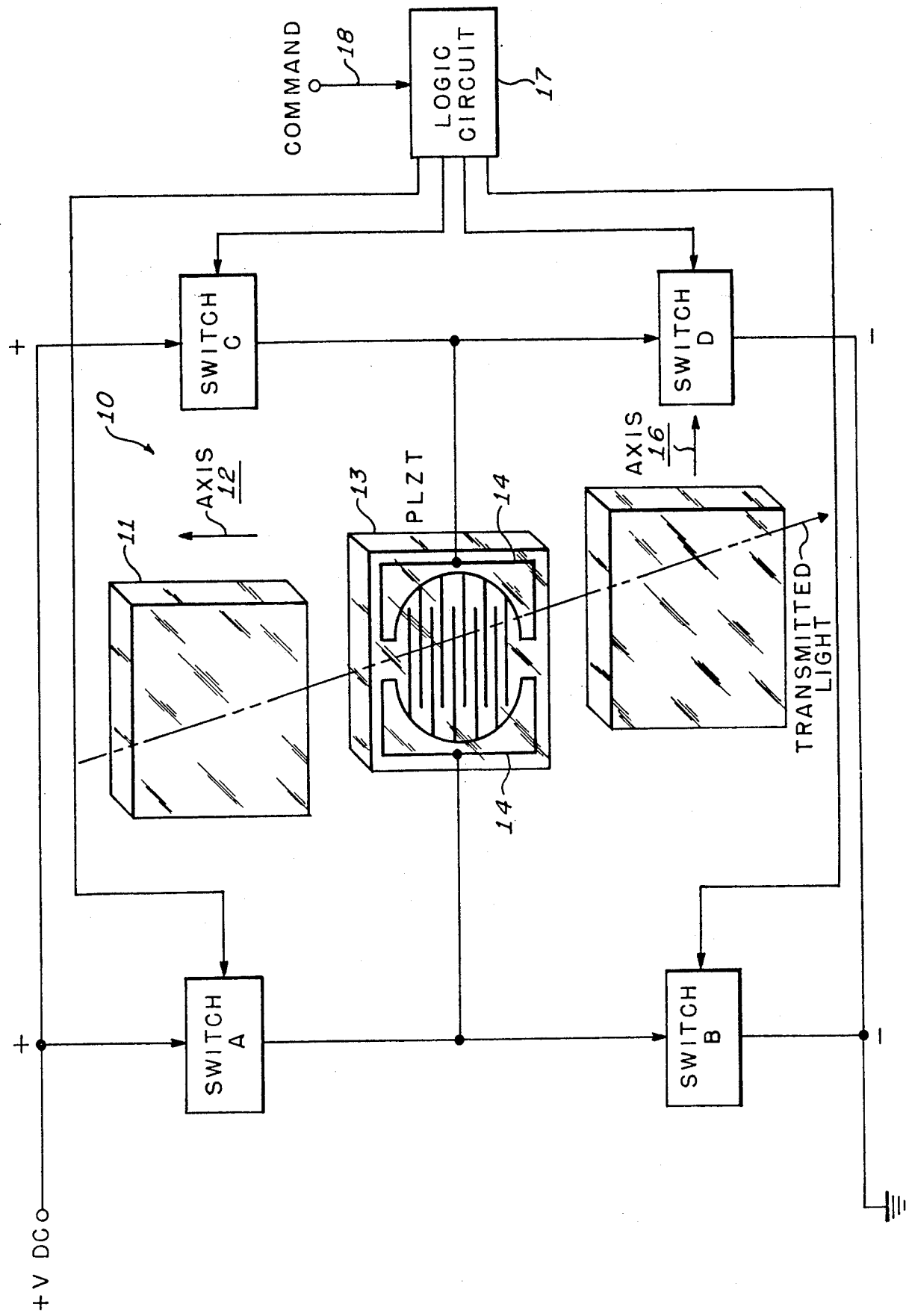

APPARATUS FOR PREVENTING SPACE CHARGE BUILDUP EFFECTS IN ELECTRICALLY CONTROLLABLE OPTICAL TRANSMISSION CELLS

This invention was made with U.S. Government support and the United States Government has certain rights therein.

BACKGROUND OF THE INVENTION

1. Field of the Invention

The invention relates to electrically controllable optical transmission cells, such as Kerr cells, particularly with respect to the use of such cells as optical shutters. In particular, Lanthanum doped Lead Zirconate Titanate (PLZT) Kerr cells are involved.

2. Description of the Prior Art

PLZT Kerr cells are utilized as the active element in present day high speed electro-optical shutters. A Kerr cell is a transparent ceramic element with electrodes disposed thereon providing variable optical retardation as a function of applied electric field. Application of an electric field transverse to the cell optical axis varies the rotation of the polarization axis of the cell. Thus, when a Kerr cell is superposed between two crossed polarizers, light transmission through the assembly is a function of the electric field applied to the Kerr cell because of the polarization rotation in the retardation plate. In the off state of the device, with no electric field applied to the PLZT, no light passes therethrough because the axes of the polarizers are orthogonal with respect to each other. Energizing the PLZT rotates the polarization of the light passing through the first polarizer by 90° causing the polarization axis of the light to align with the axis of the second polarizer. Thus, in the energized state, the optical energy is transmitted through the assembly. The proportion of optical energy transmitted in the ON state compared to that transmitted in the OFF state is denoted as the extinction ratio. The Kerr cell shutter can be placed in a continuous light transmitting state by continuous application of an activating voltage. The shutter can also be operated in a pulsed mode by application of voltage pulses thereto.

In the prior art, a voltage level or voltage pulses of the same polarity are applied to activate the device. With continuous application of a unipolar voltage or after repeated pulsing of the Kerr cell with a unipolarity pulse, a degradation in the optical retardation properties results in a relatively short time. This is due to a tendency of the optically active material in the Kerr cell to acquire an internal space charge so that the cell performs as if the activating electric field is still applied even after the activating voltage source is removed. This property has been observed when utilizing PLZT as the optically active material. This effect is more pronounced for repeated pulse activation than for continuous voltage. With the charge buildup, some optical retardation remains when the device voltge is removed. The effect in the prior art devices was that optical transmission would not be completely extinguished between the two polarizers and therefore the extinction ratio was severely degraded. In prior art devices, continuous usage for 20 hours or after application of several hundred pulses, rendered the devices useless.

Presently, there is no known way of removing the deleterious space charge except heat annealing and there is no prior method to avoid the space charge. When such prior art devices exhibited this behavior, the devices would be permitted to remain unenergized for several days. If the performance degradation did not improve, the cell would be discarded. Thus, removal from service or discarding due to space charge buildup were the only solutions to this problem in the prior art.

SUMMARY OF THE INVENTION

The invention obviates the disadvantages of the prior art by applying a continuously reversing field to the Kerr cell to avoid space charge buildup. When the field applied is reversed for each successive pulse actuation, or continually reversed for continuous operation, space charge caused by the applied field does not accumulate. Since the Kerr cell functions as a result of applied electrical field irrespective of field polarization, no reduction in optical performance results.

BRIEF DESCRIPTION OF THE DRAWINGS

The sole FIGURE is a schematic block diagram of a Kerr cell actuation circuit configured in accordance with the present invention. The circuit is shown actuating an electro-optical shutter utilizing a Kerr cell illustrated in exploded perspective view.

DESCRIPTION OF THE PREFERRED EMBODIMENT

Referring to the FIGURE, an electro-optical shutter 10 utilizing a Kerr cell includes a first polarizer 11 that linearly polarizes light entering the shutter in the direction indicated by the polarization axis 12. A PLZT transparent crystal Kerr cell 13 superposed with respect to the polarizer 11 functions as a voltage variable retardation plate; i.e., a voltage variable polarization rotator. Electrodes 14 disposed on the surface of the transparent crystal 13 generates a transverse electric field when the electrodes 14 are energized. A second polarizer 15 superposed with respect to the crystal 13 is polarized orthogonally with respect to the polarizer 11 as indicated by the polarization axis 16. The polarizer 15 only transmits light polarized parallel to its plane of polarization. Thus, since the polarizer 11 is orthogonally polarized with respect to the polarizer 15, the PLZT crystal 13 must produce 90° of rotation in order to pass light through the shutter 10. This function is performed when a transverse electric field is applied via the electrodes 14. When the field is removed, the PLZT 13 does not provide polarization rotation and the light is blocked. In the absence of the present invention, when constant use results in space charge buildup, a residual field exists which rotates polarization so that the light is never completely blocked.

In accordance with the invention, if the applied electric field is reversed for each successive pulse actuation or is continuously reversed for a continuous open shutter condition, space charge buildup will not occur. The PLZT cell 13 is arranged in the center leg of an "H switch" configuration comprised of switches A, B, C and D. A +V volt d.c. actuation power source is applied to switches A and C and switches B and D are returned to ground potential. The voltage +V may be whatever the electrode design requires for operation and typically may be in the range of 100–700 V d.c. The switches A, B, C and D are actuated in a manner to be described by a logic circuit 17 responsive to a command applied at a terminal 18. When switches A and D are closed, the Kerr cell 13 is polarized +/− left to right and when switches B and C are closed, the cell 13 is polarized +/− right to left. The cell 13 has a large capacitance and whenever it is desired to deactuate the cell rapidly, the cell 13 is discharged by closing switches B and D with switches A and C open. The switches A, B, C and D may be implemented by any suitable electrically actuated device. Since the cell 13 requires application of a relatively high voltage and high speed operation is desirable, preferably fast electronic switches such as power field effect transistors are utilized as the switch elements. The following Table 1 illustrates the switching sequence utilized to prevent space charge build-up:

TABLE 1

| COMMAND | SWITCH STATUS | | | |
|---|---|---|---|---|
| | A | B | C | D |
| FIRST OPEN SHUTTER | CLOSED | OPEN | OPEN | CLOSED |
| FIRST SHUT SHUTTER | OPEN | CLOSED | OPEN | CLOSED |
| SECOND OPEN SHUTTER | OPEN | CLOSED | CLOSED | OPEN |
| SECOND SHUT SHUTTER | OPEN | CLOSED | OPEN | CLOSED |
| . | . | . | . | . |
| . | . | . | . | . |
| . | . | . | . | . |

When the first "open shutter" command is applied to the terminal 18, switches A and D are closed with switches B and C open. When the first "shut shutter" command is applied, switches A and C are opened while switches B and D are closed. This "shut shutter" command shorts the cell 13 discharging the field. The next "open shutter" command causes switches B and C to close with switches A and D open, thus applying a reversed field. The next "shut shutter" command again opens switches A and C while switches B and D are closed, shorting the cell. Further actuating commands repeat the sequence. The logic circuit 17 includes conventional circuitry for performing the operations described. If the desired operating mode is continuously open, then a clock within the logic circuit 17 maintains the cycle of Table 1 in a continuous fashion utilizing long open shutter periods and very short shut shutter intervals during which the cell is discharged. Since shutter actuation occurs in approximately one microsecond, the cycling will be sufficiently rapid to ensure that no flicker is observed.

It is appreciated that the logic circuit 17 performs the function of assuring that the PLZT cell 13 is discharged after each field application and that the voltage polarity is alternated. In this manner, the electric field is reversed with each actuation of the PLZT device negating any buildup of a space charge layer. By changing the polarity of the applied voltage every few seconds when operated continuously or with every pulse when utilized in a pulsed mode, the cause of degradation of operation; viz, the space charge buildup in the material, is not permitted sufficient time to occur. The present invention permits a PLZT-type Kerr cell to be operated without long term degradation of optical properties or any variations in operating voltage.

Although the present invention was described in terms of a d.c. actuating potential and reversing switches, it is appreciated that an alternating reversing potential, such as a square wave, a pulse train or a sine wave may be utilized to the same effect.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for operating an electrically controllable optical cell for neutralizing space charge effects thereof comprising an electrically controllable optical transmission cell, a source of said cell actuating potential, first and second serially arranged switches coupled between said source of cell actuating potential and ground, said first and second switched having a first junction therebetween, third and fourth switches coupled between said source of cell actuating potential and ground, said third and fourth switches having a second junction therebetween, said cell coupled between said first and second junctions, and logic means coupled to actuate said first, second, third, and fourth switches so that said polarity of said actuating potential across said cell sequentially reverses.

2. The apparatus of claim 1 wherein said logic means is responsive to open commands and shut commands so that for consecutive first and second open commands, said first and fourth switches are closed with said second and third switches open in response to said first open command and said second and third switches are closed with said first and fourth switches open in response to said second open command.

3. The apparatus of claim 2 wherein said shut commands alternate with said open commands with said second and fourth switches closed and said first and third switches open in response to said shut commands so that said cell is discharged.

4. The apparatus of claim 1 wherein said cell comprises a Kerr cell.

5. The apparatus of claim 4 wherein said Kerr cell comprises a PLZT Kerr cell.

* * * * *